United States Patent [19]

Laude et al.

[11] Patent Number: 4,622,662
[45] Date of Patent: Nov. 11, 1986

[54] WAVELENGTH-SELECTIVE MULTIPLEXER-DEMULTIPLEXER

[75] Inventors: Jean-Pierre Laude, Saclas; Jean Flamand, Chatenay-Malabry; Gérard Pitois, Arpajon; Didier Lepére, Sevres, all of France

[73] Assignee: Instruments S.A., France

[21] Appl. No.: 595,739

[22] Filed: Apr. 2, 1984

[30] Foreign Application Priority Data

Mar. 31, 1984 [FR] France .................. 83 05364

[51] Int. Cl.⁴ .................................. H04B 9/00
[52] U.S. Cl. ................................ 370/3; 350/96.19
[58] Field of Search ............ 370/3, 1, 2; 350/96.15, 350/96.16, 96.19

[56] References Cited
FOREIGN PATENT DOCUMENTS 55-29824 8/1978 Japan .................. 350/96.19
2086168 5/1982 United Kingdom ........ 370/3

OTHER PUBLICATIONS

Belovolov—"Spectral Demultiplexer"—Sov. J. Quantum Electronics, Feb. 1982, pp. 252–254.

Primary Examiner—Joseph A. Orsino, Jr.
Attorney, Agent, or Firm—Handal & Morofsky

[57] ABSTRACT

A multiplexer-demultiplexer for different wavelengths carried by optical fibers (10) the ends of which are disposed in the immediate vicinity of the focus of a concave mirror (18) associated with a plane diffraction grating (15) is disclosed.

The multiplexer-demultiplexer consists of four elements that are adhesively attached to one another, namely, a fiber-carrying element (1); a grating-carrying element (15); an intermediary element (3) of the same index as the element (2); and a mirror element (4) having an index of refraction different from that of element (3) and selected to compensate for longitudinal spherical aberration of the mirror (18) for at least one of the wavelengths being utilized.

19 Claims, 4 Drawing Figures

WAVELENGTH-SELECTIVE MULTIPLEXER-DEMULTIPLEXER

CROSS-REFERENCE TO RELATED APPLICATIONS

This application is related to U.S. patent application Ser. No. 559,600 of Laude filed Dec. 8, 1983 and entitled Divided Function Optical Component For Optical Transmissions, and U.S. Ser. No. 514,390 of Laude filed July 15, 1983 and entitled Optical Isolation Device For Multiplexing or Demultiplexing Wavelengths, and U.S. Ser. No. 514,386 of Laude filed July 15, 1983 and entitled Compact Wavelength Multiplexer-Demultiplexer With Variable Filtration and U.S. Ser. No. 452,481 of Laude filed Nov. 23, 1982 and entitled Wavelength Selector, which, in turn, is U.S. Ser. No. 247,440 of Laude filed Mar. 25, 1981 now abandoned and entitled Monochromator.

TECHNICAL FIELD

The present invention relates to a wavelength-selective multiplexer-demultiplexer with a plane diffraction grating and a concave mirror and is more particularly intended to be a component for transmission facilities using fiber optics. The invention also relates to a method for producing such an assembly.

BACKGROUND OF THE INVENTION

Already known from French Pat. No. 2,479,981 and, more particularly, from the second addition thereof, U.S. Pat. No. 2,496,260, is an integral assembly that permits the regrouping, in the same long-distance transmission fiber, of several light beams of different wavelengths carried in as many input fibers. Alternatively, in reverse order, it permits the separation of several light beams of different wavelengths, carried in a single transmission fiber, into several beams directed to different optical fibers.

In such a device, the ends of the input and output fibers are embedded in a first transparent block and terminate in an opening placed in a plane diffraction grating formed on one endface of this first block. The face of the first block carrying the grating is glued to a second block whose opposite endface forms a spherical, or preferably, a parabolic mirror, the focus of which lies in the immediate vicinity of the ends of the fibers.

While such a device is optically quite satisfactory, it is not well-suited for large-scale industrial production as now demanded by the development of teletransmission via fibers.

A first difficulty lies in the production of the first block where, after forming a replicated diffraction grating on it, it is necessary to make a central hole to permit the flush positioning of the ends of the input and output fibers. Now only can this procedure cause local damage to the edges of the diffraction grating around the hole but it is thereafter very difficult to place the fibers into exact relative positions within the block and the hole. A second difficulty derives from the fact that a high degree of stigmatism practically dictates the use of a parabolic mirror rather than a spherical one which leads to increased costs of production.

The invention aims at an optical assembly that is easy to manufacture in mass production and offers high stigmatic quality while using a simple spherical mirror.

The invention is applicable to a multiplexer-demultiplexer of the type in which the light beams of different wavelengths that are to be mixed or separated are carried via optical transmission fibers whose ends are disposed in the immediate vicinity of the focus of a concave mirror associated with a plane diffraction grating.

SUMMARY OF THE INVENTION

According to a preferred embodiment of the invention, the assembly consists of four transparent elements that are adhesively joined to one another in succession, namely:

(a) a fiber carrier element in which the input and output fibers are embedded such that their ends are flush with the plane surface making contact with the following element;

(b) a grating-carrying element having a plane face for making contact with the fiber-carrying element and an opposing face on which a diffraction grating is formed, except for a zone within the exit cones of the fibers;

(c) an intermediate element of the same index of refraction as the grating-carrying element; and (d) a mirror element having a plane face for making contact with the intermediate element and an opposing spherical face which is treated to form a spherical mirror facing the intermediate block and the grating. The mirror element has an index of refraction which is different from that of the intermediate element and is determined in such a way as to compensate for longitudinal spherical aberration for at least one of the incident wavelengths being utilized.

Further according to the invention, the method for producing such an assembly is characterized in that, after formation of the diffraction grating on the grating-carrying element by any standard replicating method and after covering the grating with a reflecting layer, a portion of the grating is locally eliminated by photolithography within the zone of the exit cones of the fibers. The adhesive contact between the grating-carrying element and the intermediate element is established by means of a resin of the same index of refraction as that of the grating-carrier which, in turn, is selected to be as close as possible to that of its neighboring elements. The method is further characterized in that, during assembly, the relative position of each element is adjusted by sliding the plane contact surfaces against one another prior to final gluing.

BRIEF DESCRIPTION OF THE DRAWINGS

The invention will be better understood by reference to two exemplary embodiments illustrated by the attached drawing figures, in which.

BEST MODE FOR CARRYING OUT THE INVENTION

Referring at the outset of FIGS. 1-3, there will be seen a device that performs the same function as that described with reference to FIG. 1 of the French Pat. No. 2,496,260 but which, in the present embodiment, is composed of four elements that are adhesively joined to one another in succession. Element 1 is a simple support or carrier for the optical input and output fibers. Element 2 serves merely as a support or carrier for the diffraction grating Element 3 is an intermediate element and element 4 comprises only the concave mirror.

The fiber-carrying element 1 could be advantageously embodied by using the method described in French Pat. No. 2,411,424, relating to a connector for optical fibers; in this case, only one of the two blocks normally required for a connector would be needed.

In order to increase the capacity of the multiplexer-demultiplexer assembly it will be useful to join together at least two fibers carrying light of the same wavelength, i.e., either input fibers for a multiplexer of output fibers for a demultiplexer. These fibers, as well as those carrying the ensemble of lightbeams of different wavelengths, are aligned in a direction that, during assembly, is rendered perpendicular to the direction of the grating lines.

Figure 3:
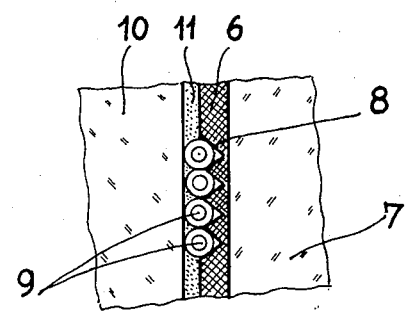

Referring particularly to FIG. 3, it will be noted that, as in French Pat. No. 2,411,424, customary methods are used to create a kind of grid having parallel traces with a spacing equal to the outside diameter of the fibers. This grid is copied in resin or plastic in order to support the fibers. In FIG. 3, such a plastic support 6 is seen glued to the glass block 7. The support 6 as shown has four grooves 8 suitable for a device having one transmission fiber carrying light of mixed wavelengths and three fibers each carrying light of a single wavelength. Each of the fibers 9 is disposed in a groove 8 and then covered by a second block 10 after interposition of an adhesive layer 11. After final solidification of the assembly, the block so formed is cut by a saw and the cut surface is optically polished to obtain one of the plane end faces of the junction 13 between the elements 1 and 2. The fibers 9 emerge from the other side of the element 1 for attachment to emitters, receivers or a transmission line.

The grating support element 2 is a transparent block with one polished face constituting the junction plane 13 to the element 1 and another face that carries the diffraction grating 15. The grating 15 is formed in the customary manner, i.e., as a replica of an original engraved or holographic grating, and is then covered with a thin reflective metal coating. In order to make possible the undeviated passage of light to or from fibers 9, the grating 15 must be locally neutralized in a zone 16 where it covers the exit or entrance cone of the fibers, i.e., the angular zone of acceptance of light beams in the core of the fibers. The neutralization of the grating in that zone 16 is accomplished by means of photolithography so as to locally eliminate the reflecting layer. It will be appreciated that this method does not cause any alteration of the grating outside of the treated zone or, in particular, of its edges. If the face carrying the grating is glued on an intermediate element 3 of the same index of refraction as element 2, it is sufficient to use as an adhesive a resin of the same index as that forming the support for the grating 15, which, in turn, is also selected to have an index as close as possible to that of the two blocks 2 and 3. Thus, as the adhesive fills the grooves of the grating support, it re-establishes complete optical continuity which permits the passage of the light beams without imparting any deviation.

The intermediate element 3 presents merely two polished faces for respective adhesive attachment to the grating 15 on the element 2 and to conjugated plane face of the element 4 to form the junction plane 17.

The face of the element 4 opposed to the junction plane 17 is a spherical surface so treated as to form a concave mirror 18. The element 4 is made from a material having an index of refraction different from, and generally lower than, that of the intermediate element 3.

It will be noted, firstly, that the optical function of the assembly so embodied is entirely identical to that of the assembly described in French Pat. No. 2,496,260. For example, when operating as a demultiplexer, the mixed light beam is guided by one of the fibers 9 whose end lies in the apparent focus of the mirror 18, i.e., at the locus of the image of its real focus in the dioptric plane 17. After refraction by the dioptic plane 17, the rays coming from the extremity of the fiber are thus redirected by the mirror 18 into a parallel bundle traveling toward the grating 15 which disperses them into as many parallel beams as there are wavelengths in the mixed light beam. Each parallel light beam then travels along a return path and is focused on the end of an output fiber 9. However, in the present case, the choise of different indices of refraction for the elements 3 and 4 makes possible the correction of aberrations of the spherical mirror 18 such that there is no problem of any kind with using a spherical mirror which is much easier to produce industrially than a parabolic mirror.

Moreover, the use of glass for the mirror 4 having an index lower than that of the element 3 increases the effective field in the focal plane containing the ends of the fibers 9, making possible an increase in the number of usable fibers and, hence, of the capacity of the device.

It will be further noted that each of the elements 1, 2, 3, and 4 is easy to produce industrially in large numbers and that the adjustment of each assembly results simply form an adjustment of the relative positions of one element with respect to another, by sliding the plane surfaces in contact with each other as required prior to final gluing.

Of course, it is also useful to seek an improvement of the transmissive properties between fibers and, for example in the case of a multiplexer connected to emitters constituted by light-emitting diodes having a fairly broad emission range, it would be advantageous to select input fibers whose core diameter is larger than that of the fibers in the transmission line; the curve of transmissivity as a function of wavelength then shows an extended flat zone with maximum transmission.

For the case where the emitters are lasers, the core diameter of the transmission fibers may be equal to or greater than that of the input fibers.

Figure 4:
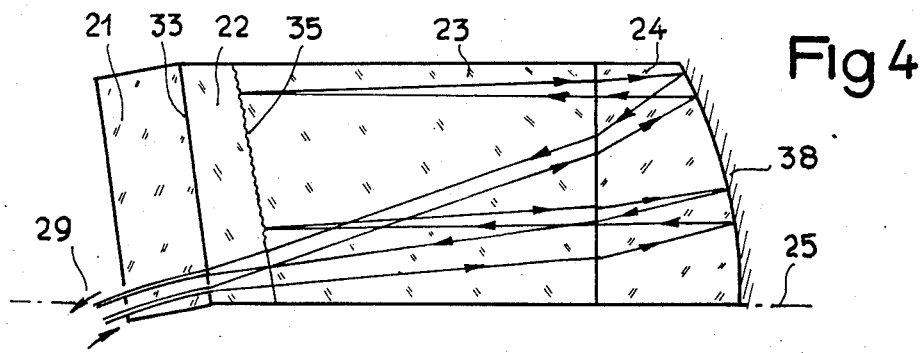
FIG. 4 is similar to FIG. 1, showing a variant of the invention not requiring local neutralization of the diffraction grating.

The structure of the multiplexer-demultiplexer with four elements that are produced independently, assembled with a simple adjustment of relative position and then glued together, described hereinabove with reference to an assembly operating in the principal axis of the mirror and across a neutralized zone of the diffraction grating, may also be utilized in an assembly operating off-axis and thus preserving the integrity of the diffraction grating. FIG. 4 shows such an assembly, again composed of four elements 21, 22, 23 and 24, attached adhesively on to the other. However, in this embodiment, the ends of the fibers 29 are oriented in a direction that makes an angle with the principal axis 25 of the mirror 38 such that the entry or exit cone of the figers does not cross the grating 35. This makes it possible to leave the grating intact after being formed on the carrier element as well as to increase the luminous efficiency of the system by avoiding losses at the locally neutralized zone of the grating. It might be mentioned that, in this case, the junction between the elements 21 and 22 has a different angular position from that of the example of FIG. 1, because, in both instances, this junction plane where the ends of the fibers are located must coincide with the focal plane of the different wavelengths after passage through the mirror element and the intermediate element.

The orientation of this focal plane will be different according to whether operation takes place along (FIG. 1) or off (FIG. 4) the axis of the spherical mirror.

Figure 1:
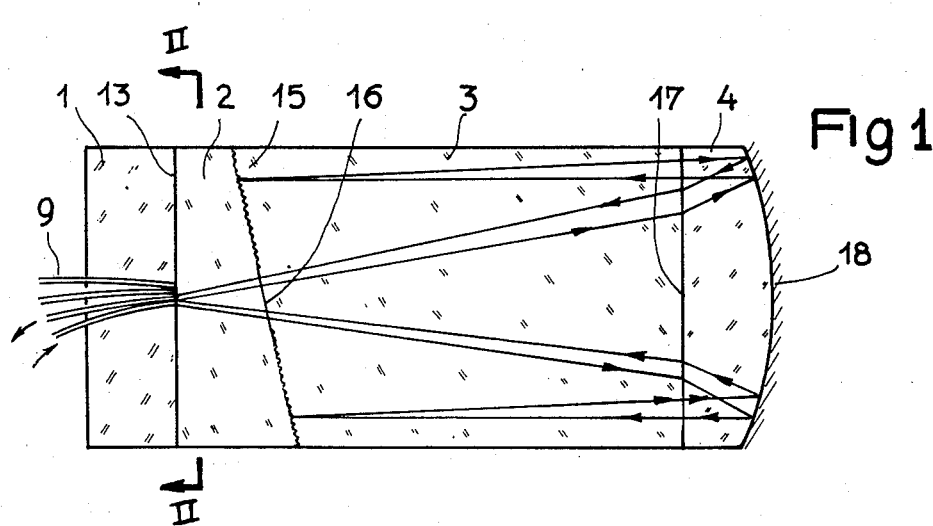
FIG. 1 is a medial section of a device according to the invention.
Figure 2:
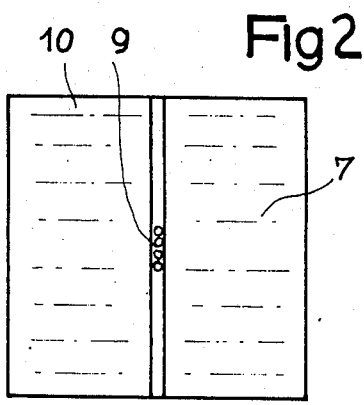
FIGS. 2 and 3 are sections along lines II—II of FIG. 1 and show more explicitly the disposition of the optical input and output fibers.

In the same way, in the example of both FIG. 1 and FIG. 4, when the shape of the grating-carrying element 2 or 22 is determined, care should be taken that the principal planes of the facets of the diffraction grating be substantially parallel to the contact planes 13 or 33 between the elements 1 and 2 or 21 and 22, respectively.

A multiplexer assembly for three wavelengths, lying at 0.8, 1.06 and 1.3 microns, respectively, has been determined, according to the embodiment of FIG. 4, to include a mirror element made of silica having and index of refraction of 1.444 on which is formed a spherical mirror with a radius of 63.48 mm. The grating-carrying element and the intermediary element are made of glass sold by the firm SOVIREL under the reference number FBS E0046 with an index of refraction of 1.771.

It will be appreciated that the invention is not strictly limited to the embodiments described here by way of example but rather also covers embodiments differing therefrom in their details, by variations in execution or by use of equivalent means.

We claim:

1. A multiplexer-demultiplexer of the type wherein light of different wavelengths to be mixed or separated is carried by optical transmission fibers, the ends of which are disposed in the immediate vicinity of the focus of a concave mirror associated with a diffraction grating, comprising four transparent elements that are glued one to the other successively:

(a) a fiber-carrying element in which the input and output fibers are embedded with their ends flush with the plane contact surface of the following element;
   (b) a grating-carrying element having a plane face for contact with said fiber-carrying element and an opposing plane face on which is formed the diffraction grating except for a zone located within the exit and entry cones of the fibers;
   (c) an intermediate element having the same index of refraction as the grating-carrying element; and
   (d) a mirror element with a plane face for contact with the intermediate element and an opposing spherical face treated to constitute a spherical mirror facing the intermediate element and the grating, said mirror element having an index of refraction different from that of the intermediate element and having a refractive index which compensates for longitudinal spherical aberration for at least one of the incident wavelengths being utilized.

2. A multiplexer-demultiplexer according to claim 1, characterized in that the contact plane between the fiber-carrying element and the grating-carrying element corresponds to the focal plane of the different wavelengths after passage through the assembly formed by the mirror element and the intermediary element.

3. A multiplexer-demultiplexer according to claim 1 or 2 characterized in that the principal planes of the facets of the diffraction grating are approximately parallel to the plane of contact between the fiber-carrying element and the grating-carrying element.

4. A multiplexer-demultiplexer according to claim 1 or 2, characterized in that the fibers are aligned in a direction perpendicular to the lines of the grating, at least two of said fibers that carry the discrete light beams being cojoined.

5. A multiplexer-demultiplexer, comprising:
   (a) a first solid transparent member having an exposed first end and a second end and a first index of refraction, said first end being configured and dimensioned to form a support for a focusing surface;
   (b) reflective means, adjacent said first end, for forming a reflective focusing surface;
   (c) a second solid transparent member having third end and an exposed fourth end and a second index of refraction, said second index of refraction being different from said first index of refraction, and having a value which compensates for longitudinal spherical aberration, said third end being positioned adjacent said second end;
   (d) first light conducting means for sending and receiving light, said first light conducting means being positioned adjacent said exposed fourth end and positioned at a first end of a path along which light is sent or received, said path extending from said first light conducting means toward said reflective means;
   (e) diffracting means proximate one of said exposed ends for diffracting light incident on said diffracting means along said path from said reflective surface and reflecting it along said path toward said reflective surface, said reflection occurring at an angle which is a function of the wavelength of light traveling along said path; and
   (f) second light conducting means positioned proximate the other of said exposed ends and positioned at the end of said path opposite said first end of said path.

6. A multiplexer-demultiplexer for combining or separating light of different wavelengths, comprising:
   (a) a first solid transparent member having first and second ends and a first index of refraction, said first end being configured and dimensioned to form a support for a focusing surface;
   (b) reflective means, adjacent said first end, for forming a reflective focusing surface;
   (c) a second solid transparent member having third and fourth ends and a second index of refraction, said third end being positioned adjacent said second end and said second index of refraction being different from said first index of refraction, the difference between said indicis contraining the reduction of an aberrant characteristic in said reflective means;
   (d) first light conducting means for sending or receiving light, said first light conducting means being positioned adjacent said fourth end and positioned at a first end of a path along which light is sent or received, said path extending from said first light conducting means toward said reflective means;
   (e) diffracting means proximate said fourth end, for diffracting light incident on said diffracting means along said path from said reflective surface and reflecting it along said path toward said reflective surface said reflection occurring at an angle which is a function of the wavelength of light travelling along said path; and (f) second light conducting means for receiving or sending light sent or received by said first light conducting means, respectively, said second light conducting means being positioned proximate said fourth end and positioned at the end of said path opposite said first end of said path to receive or send light passing along said path from or to said reflective surface of said path opposite said first end of said path.

7. A multiplexer-demultiplexer as in claim 6, wherein said second end and said third end have shapes which conform with each other.

8. A multiplexer-demultiplexer as in claim 6, wherein said second end and said third end are planar.

9. A multiplexer-demultiplexer as in claim 8, wherein said path extends from said first light conducting means through the interface of said first and second solid transparent members to said reflective focusing surface, to said diffraction grating means, from said diffraction grating means to said reflective focusing surface and from said reflective focusing surface to said second light conducting means.

10. A multiplexer-demultiplexer as in claim 9, wherein said reflective focusing surface is a concave mirror.

11. A multiplexer-demultiplexer as in claim 10, wherein said first and second light conducting means are substantially in the same plane as the focal point of said concave mirror.

12. A multiplexer-demultiplexer as in claim 11, wherein the cross-sections of said first and second solid transparent members are circular.

13. A multiplexer-demultiplexer as in claim 11, wherein said second light conducting means comprises a plurality of fiber optic members each positioned to receive light of different wavelengths diffracted by said diffraction grating means.

14. A multiplexer-demultiplexer as in claim 6, 7, 11 or 13, wherein said first index of refraction is lesser than said second index of refraction.

15. A multiplexer-demultiplexer as in claim 6 or 14, wherein said reflective means is a spherical mirror and said first and second indices of refraction are selected to cause said spherical mirror to behave as a parabolic mirror for at least one wavelength of light.

16. A multiplexer-demultiplexer as in claim 6, wherein said second light conducting means comprises an optical fiber embedded with the fiber end flush with a plane contact surface of said fourth end.

17. A multiplexer-demultiplexer as in claim 6, wherein said second light conducting means comprises a plurality of optical fibers at a plurality of positions corresponding to path ends for light of different wavelengths.

18. A device as in claim 6, wherein said second and third ends are planar and secured to each other by a transparent adhesive having the same index of refraction as said second solid transparent member.

19. A multiplexer-demultiplexer, comprising:

(a) a first solid transparent member having first and second ends and a first index of refraction, said first end being configured and dimensioned to form a support for a focusing surface;

(b) reflective means, adjacent said first end, for forming a reflective focusing surface;

(c) a second solid transparent member having third and fourth ends and a second index of refraction, said third end being positioned adjacent said second end;

(d) first light conducting means for sending or receiving light said first light conducting means being positioned adjacent said fourth end and positioned at a first end of a path along which light is sent or received, said path extending from said first light conducting means toward said reflective means;

(e) diffracting means proximate said fourth end, for diffracting light incident on said diffracting means along said path from said reflective surface and reflecting it along said path toward said reflective surface said reflection occuring at an angle which is a function of the wavelength of light travelling along said path; and (f) second light conducting means for receiving or sending light sent or received by said first light conducting means, respectively, said second light conducting means being positioned proximate said fourth end and positioned at the end of said path opposite said first end of said path to receive or send light passing along said path from or to said reflective surface of said path opposite said first end of said path said second light conducting means comprising a number of fibers, and said first index of refraction being lesser than said second index of refraction whereby said number may reach a high value.

* * * * *